United States Patent
Brusky et al.

(10) Patent No.: US 6,487,611 B1
(45) Date of Patent: Nov. 26, 2002

(54) SEAMLESS DISTRIBUTED JOB CONTROL BETWEEN A MULTIFUNCTION PERIPHERAL AND A HOST

(75) Inventors: Kevin J. Brusky, Magnolia, TX (US); Montgomery C. McGraw, Spring, TX (US); John C. Barker, Houston, TX (US)

(73) Assignee: Compaq Computer Corporation, Inc., Houston, TX (US)

( * ) Notice: Subject to any disclaimer, the term of this patent is extended or adjusted under 35 U.S.C. 154(b) by 0 days.

(21) Appl. No.: 09/253,612

(22) Filed: Feb. 19, 1999

(51) Int. Cl.[7] .............................. G06F 13/10; G06F 3/12; H04N 1/00
(52) U.S. Cl. .............................. 710/10; 710/8; 710/62; 713/323; 358/1.15
(58) Field of Search ............................... 358/1.15, 442; 710/8, 12, 10, 62; 713/320, 324, 300, 323; 399/81

(56) References Cited

U.S. PATENT DOCUMENTS

| | | | | |
|---|---|---|---|---|
| 5,361,134 A | * | 11/1994 | Hu et al. ....................... 358/296 |
| 5,477,238 A | * | 12/1995 | Aharanson et al. ........... 345/168 |
| 5,596,753 A | | 1/1997 | Bhatt ............................ 395/682 |
| 5,764,866 A | | 6/1998 | Maniwa ........................ 395/114 |
| 5,867,718 A | * | 2/1999 | Intrater et al. ............... 713/323 |
| 5,911,044 A | | 6/1999 | Lo et al. ...................... 395/200 |
| 5,915,106 A | | 6/1999 | Ard .............................. 395/500 |
| 6,003,093 A | | 12/1999 | Kester .......................... 709/301 |
| 6,101,555 A | | 8/2000 | Goshey ........................ 709/301 |
| 6,115,739 A | | 9/2000 | Ogawa ......................... 709/215 |
| 6,161,123 A | | 12/2000 | Renouard ..................... 709/203 |
| 6,195,172 B1 | * | 2/2001 | Minamizawa ............... 358/1.15 |
| 6,292,842 B1 | | 9/2001 | Crouch ......................... 709/329 |
| 6,388,771 B1 | * | 5/2002 | Tamaki ......................... 358/442 |

FOREIGN PATENT DOCUMENTS

| | | |
|---|---|---|
| DE | 198-14-522 A | 11/1998 |
| EP | 0-532-796 A | 3/1993 |
| JP | 10-126560 * | 5/1998 |

OTHER PUBLICATIONS

EPO Communication dated Jun. 5, 2001 including European Search Report and Annex.

* cited by examiner

*Primary Examiner*—Jeffrey Gaffin
*Assistant Examiner*—Ilwoo Park
(74) *Attorney, Agent, or Firm*—Sharp, Comfort & Merrett, P.C.

(57) ABSTRACT

A system for seamless distributed job control between a multifunction peripheral and a host. A host, such as a personal computer, is linked with one or more multifunction peripherals. Each multifunction peripheral has at least scanning and printing capability. However, the peripherals do not require extensive memory or processing capability, because the processing and storage of data is accomplished by the host. A user potentially may operate the peripheral through a peripheral interface or through a user interface of the host.

13 Claims, 3 Drawing Sheets

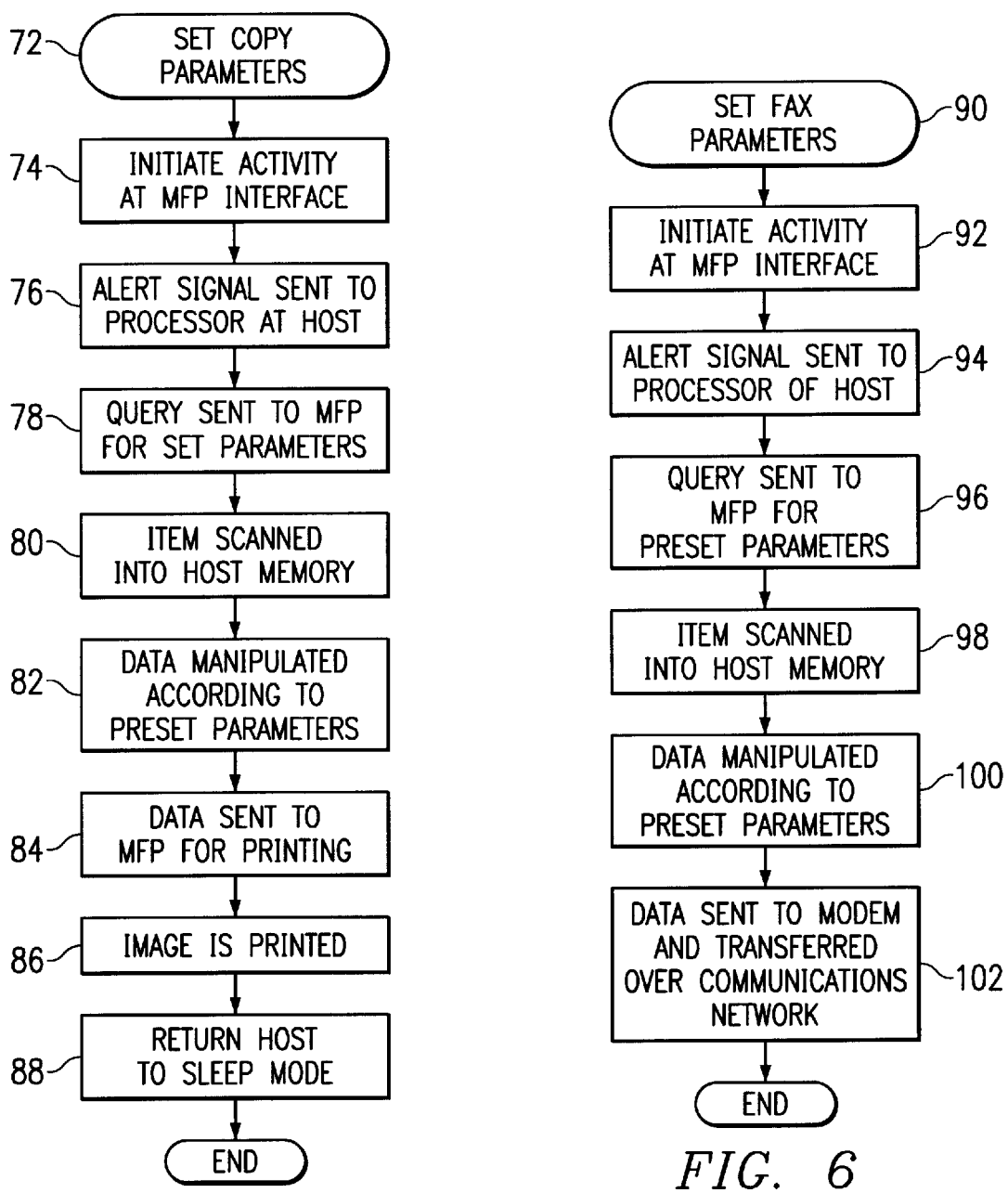

SEAMLESS DISTRIBUTED JOB CONTROL BETWEEN A MULTIFUNCTION PERIPHERAL AND A HOST

FIELD OF THE INVENTION

The present invention relates generally to systems utilizing multifunction peripherals in combination with a host, such as a personal computer, and particularly to a system in which the multifunction peripheral utilizes a processor and a memory of the host. This permits use of a to multifunction peripheral without the added expense of providing such a peripheral with its own internal extensive memory and complex processor.

BACKGROUND OF THE INVENTION

Multifunction peripherals are widely used for such tasks as scanning, copying and faxing. Many of these multifunction peripherals have a single structure or housing in which the multiple capabilities or functionalities are combined. For example, some multifunction peripherals can be used to scan documents into memory, and to print copies based on the stored data or to initiate sending of the data as a facsimile transmission.

Normally, multifunction peripherals can be used as stand-alone devices without being connected to a host device, such as a personal computer. However, it is also common to connect multifunction peripherals to a personal computer via parallel ports. This allows a user to utilize at least some of the functionality of the multifunction peripheral through the PC interface.

Even though a PC interface can be utilized, many users prefer to use the multifunction peripheral essentially as a stand-alone device to perform simple tasks like copying and sending facsimile transmissions. The user can thus avoid bringing the computer to full power, if not in use, and also avoid interrupting someone working at the personal computer, if it is in use. Also, many users prefer the simple, push-button interface commonly found on multifunction peripherals, rather than the mouse and/or keyboard interface of the personal computer.

This desire of certain users to utilize the multifunction peripheral interface and to effectively use the multifunction peripheral as a stand-alone unit has heretofore necessitated the use of internal memory and processor power in the peripheral. Thus, even when the peripheral is connected to a personal computer, there is a duplication of costs for providing both the personal computer and the multifunction peripheral with independent memories and processors.

It would be advantageous to utilize the memory and processing power of a host device, such as a personal computer, for the multifunction peripheral without requiring that a user utilize the host interface.

SUMMARY OF THE INVENTION

The present invention features a system for utilizing a host in controlling a peripheral task. The system comprises a host having a processor and a memory. The system also includes a peripheral having at least a scanner and a printer. A communication link couples the host and the peripheral to permit data to flow therebetween. However, data scanned by the scanner is stored in the memory of the host, and the functionality of the scanner and the printer is controlled by the processor of the host.

According to another aspect of the present invention, a system is provided for distributing job control between a multifunction peripheral and a personal computer. The system includes a personal computer having a processor and a memory. A multifunction peripheral is placed in communication with the personal computer. The multifunction peripheral includes a scanner and a printer, but the functionality of the scanner and the printer is controlled by the processor and the memory of the personal computer.

According to another aspect of the present invention, a method is provided for distributing job control between a multifunction peripheral and a host to eliminate the need for a complex peripheral processor and extensive peripheral memory. The method includes setting scan parameters at a peripheral, and providing a signal to a processor of a host unit to initiate the scan. The method further includes utilizing the host unit processor to scan a desired image based on the scan parameters, and storing the desired image in a memory of the host unit.

BRIEF DESCRIPTION OF THE DRAWINGS

The invention will hereafter be described with reference to the accompanying drawings, wherein like references numerals denote like elements, and:

FIG. 5 is a flow chart illustrating the steps of distributing control from a host to a multifunction peripheral, according to a preferred embodiment of the present invention; and FIG. 6 is a block diagram similar to that illustrated in FIG. 5, but showing an alternate functionality.

DETAILED DESCRIPTION OF THE PREFERRED EMBODIMENTS

Figure 1:
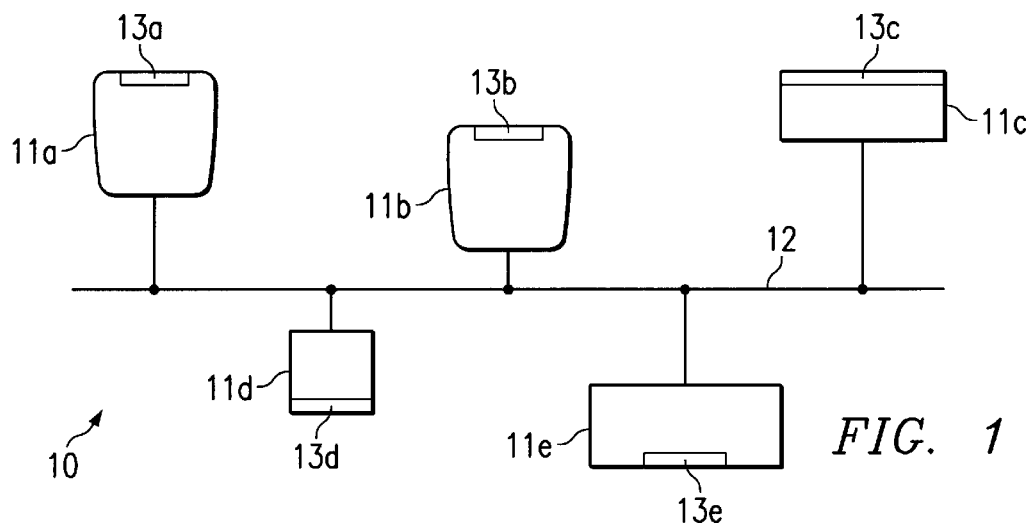
FIG. 1 is a schematic diagram of a plurality of devices linked together for communication, according to a preferred embodiment of the present invention.

Referring generally to FIG. 1, a distributed control system 10 is illustrated according to an exemplary embodiment of the present invention. System 10 includes at least two and potentially a plurality of devices 11A through 11E linked together via a communication link 12. Communication link 12 may comprise a variety of specific embodiments able to transmit data between devices. For example, communication link 12 may be a direct cable or wire link as well as a network over which the devices are able to communicate with one another.

In the embodiment illustrated, one. or more of the devices, e.g. 11E, comprises a host device, while the remaining devices 11A through 11D are secondary or peripheral devices. Additionally, each device includes a user interface 13A through 13E, respectively.

The present invention allows a user to interact with a user interface, e.g. 13A, at a peripheral device, e.g. 11A, to accomplish a desired task. The peripheral device, such as 11A, utilizes external processing and/or memory capacity of a remote device, such as the host 11E. However, the fact that device 11A utilizes, for example, the processing power, memory or faxing capability, of another device is transparent to the user. Thus, the user can interact with the interface of a desired peripheral without being aware that functions may be performed at another device. This allows one or more of the secondary or peripheral devices to be constructed with reduced or removed processing and memory capacities.

Effectively, the present invention provides a functional user interface at secondary devices, such as printers, scanners, facsimile machines, copiers, etc. that permit a user to avoid initiation of the desired functionality from the user interface of a connected host, such as host 11E. This also permits a second user to utilize interface 13E of host 11E while the first user performs desired functions, such as scanning, copying or printing, via one or more of the user interfaces 13A through 13D. Both users, however, simultaneously utilize the processor capability and/or memory of the remote host device.

Figure 2:
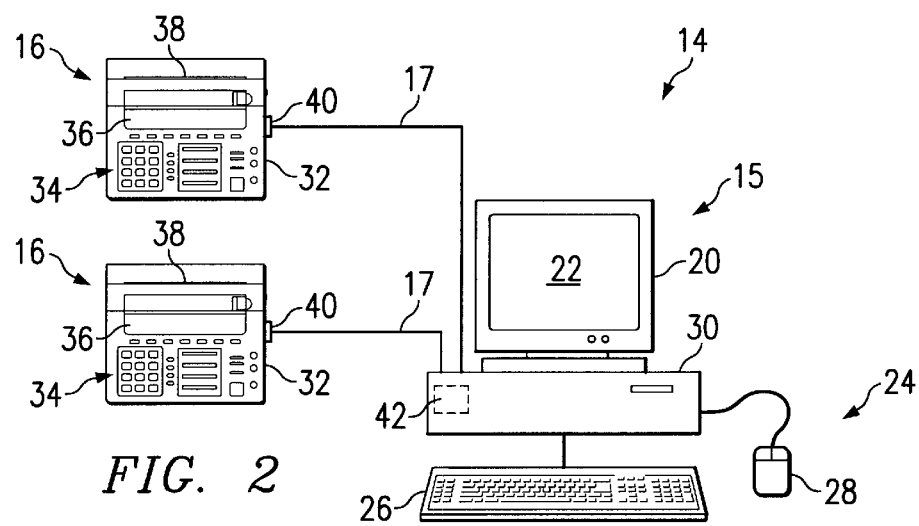
FIG. 2 is a schematic diagram of an exemplary combined host and multifunction peripherals, according to a preferred embodiment of the present invention.

A specific embodiment of a distributed control system, according to an exemplary embodiment of the present invention, is illustrated in FIG. 2. In this embodiment, a distributed control system 14 includes a host 15 coupled to one or more peripherals 16, e.g. multifunction peripherals, by a communication link 17. In the illustrated embodiment, two multifunction peripherals 16 are illustrated as coupled to host 15, but the actual number of multifunction peripherals can vary.

One type of preferred host 15 is a personal computer 18, such as that illustrated in FIG. 2. Personal computer 18 may include a monitor or display 20 having a screen 22 for displaying data and facilitating interaction with a user. Additionally, personal computer 18 includes a user interface 24 that may comprise, for example, a keyboard 26 and a mouse 28. Computer 18 also includes a central housing 30 that may enclose a variety of components including disk drives, CD drives, a CPU, memory chips modems etc.

Each peripheral 16 is a device or collection of devices that have at least printer and scanner functionality. Other functions, such as fax capability, also may be included in one or more of the multifunction peripherals 16. In the embodiment of FIG. 2, each multifunction peripheral 16 can be assumed to have printer, scanner and fax functionality, combined in a single housing or unit 32. However, the peripheral need not have all of its functions combined in a single unit.

Each multifunction peripheral 16 also includes a user interface 34 through which a user may control the operation of the multifunction peripheral. Typically, each peripheral 16 also includes a display screen 36 for displaying certain operational parameters or eliciting appropriate input from a user. Also, a wide variety of paper trays or feeders 38 may be used to deliver one or more sheets to the multifunction peripheral for such operations as copying or sending facsimile transmissions.

A unique characteristic of each multifunction peripheral 16, when connected in distributed control system 14, is that it does not require a conventional processor or memory, as with stand-alone multifunction peripherals. The data storage and processing power is provided by host 15 which communicates with each multifunction peripheral over an appropriate communication link or links 17. In a typical embodiment of distributed control system 14, communication link 17 is a hardwire link that interfaces with a parallel port 40 of multifunction peripheral 16 and a parallel port 42 of host 15. However, communication link 17 may have a variety of forms. For example, communication link 17 may be formed by direct wiring, including USB, participation on a network, such as an Intranet, RF communication or a variety of other data transfer forms.

Figure 3:
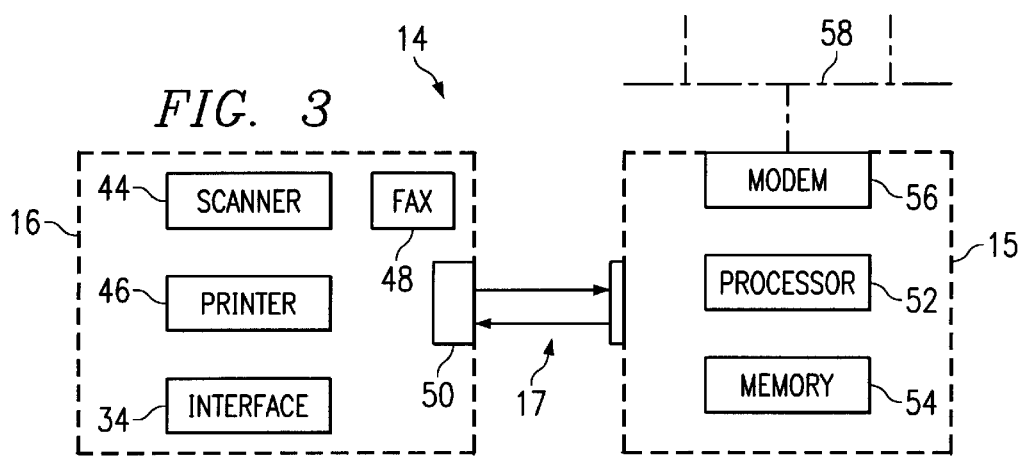
FIG. 3 is a diagram representing the functionality of a host connected to a multifunction peripheral, according to a preferred embodiment of the present invention.

Referring generally to FIG. 3, a single multifunction peripheral 16 is diagrammatically illustrated as connected to a single host 15. Multifunction peripheral 16 includes at least a scanner 44 and a printer 46. Additionally, the illustrated embodiment includes a fax capability represented by a fax 48. The functionality of the printer, scanner and fax can be selected and controlled by a user via user interface 34.

Typically, multifunction peripheral 16 utilizes firmware (ROM) 50 to communicate data to host 15 across communication link 17. The transfer of data across communication link 17 allows peripheral 16 to utilize the memory and processing power of host 15, which obviates or at least reduces the need for a processor and memory independent of the host. Accordingly, host 15 includes both a CPU or processor 52 and a memory 54, as illustrated. It should be noted that host 15 may have a wide variety of forms, e.g. personal computer 18, as well as a variety of capabilities and functionalities that can be used independently of peripheral 16. Host 15 also may include a modem 56 that can be coupled to a communications network 58.

The arrangement of distributed control system 14 allows a user to interface with the multifunction peripheral 16. However, performance of such tasks as scanning, copying or faxing utilizes the processor 52 and memory 54 of its host 15.

Figure 4:
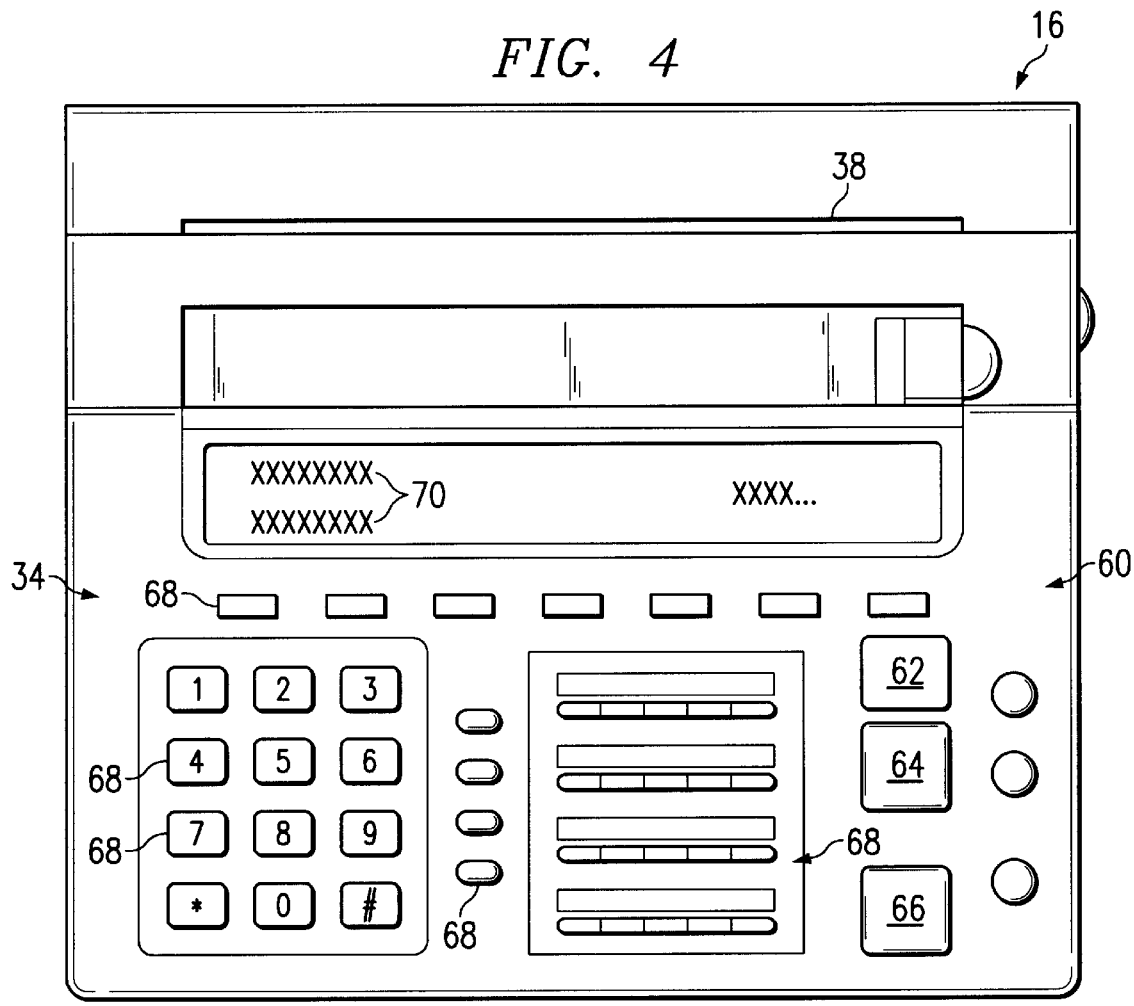
FIG. 4 illustrates an exemplary user interface of a multifunction peripheral, such as those illustrated in FIG. 2.

An exemplary user interface 34, as illustrated in FIG. 4, includes one or more function initiation keys 60. By way of example, function initiation keys 60 may include a scan key 62, a copy key 64 and/or a fax key 66. When the user wishes to make a copy, for example, copy key 64 is pressed. Actuating key 64 causes an alert signal to be sent over communication link 17 to host 15. Upon receipt of the alert signal, processor 52 queries multifunction peripheral 16, via communication link 17, to ascertain various parameters regarding the specific function initiated by the user. For example, the multifunction peripheral may have preset default values or present values input by a user for a variety of parameters related to the function to be performed.

Preferably, user interface 34 is designed to permit a user to input desired preset parameters through a plurality of input keys 68. If the desired function is copying, the parameters may include quality of scan, paper size, contrast, darkness, and potentially a variety of other parameters, as are available on conventional multifunctional peripherals. It should be noted that display screen 36 can be used to elicit various inputs from a user by a plurality of prompts 70.

Once the preset parameters are obtained by host 15, the item to be copied is scanned by scanner 44, which is driven by the host 15, and stored in memory 54. Following storage of the data in memory 54, processor 52 performs any required data messaging such as that required by the preset parameters. It should be noted that host 15 may be utilized to set items or parameters in the peripheral 16 prior to the scan. The massaged or altered data is then sent across communication link 17 to multifunction peripheral 16 for printing by printer 46.

The use of a distributed control system 14, such as that described above, is advantageous in that it eliminates the need for expensive duplication of memory and processing power in each individual multifunction peripheral. The peripherals can rely on the processing power and memory of a central host, such as a personal computer. Additionally, providing a functional user interface 34 at each multifunction peripheral 16 allows a user to avoid initiation of the scanner, printer and/or fax functionality from the user interface of the personal computer. In other words, an operator can be utilizing host 15, while another user takes advantage of the scanning, copying, printing, and faxing capabilities of a peripheral linked to the processor 52 and memory 54 of the host 15.

If the host is not being utilized by an operator, it may be allowed to resort to a "sleep" mode, as is a common practice with personal computers. In this event, a user's initiation of an operation by depressing a function initiation key 60 preferably provides a signal to processor 52, which, in turn, causes the host to return to full power. (It should be noted that initiation of an operation and return from sleep made can be interface dependent and vary from one device to another.) In the exemplary embodiment, it is not necessary to power the monitor 20 or any audio systems of host 15 prior to use of peripheral 16. Then, following performance of the desired function, e.g., scan, copy, fax etc., the host can be allowed to return to the low power or sleep mode.

In some applications of distributed control system 14, it is desirable to simultaneously utilize scanner 44 and printer 46. Effectively, this requires time-sharing of the scanner/printer interface, e.g. parallel port 40, so that data can be scanned into memory 54 of host 15 at essentially the same time as other data is sent to printer 46 via communication link 17. This simultaneous use of scanner 44 and printer 46 can be accomplished by sending partial data from scanner 44 to memory 54 while intermittently sending partial data from memory 54 to printer 46. This procedure is commonly referred to as "banding" and is readily understood by those of ordinary skill in the art.

Specific exemplary operations of distributed control system 14 have been set forth in block diagram format in FIGS. 5 and 6. For example, in a copy operation at a given peripheral 16, the copy parameters are initially set, as indicated by block 72. The copy parameters can be set by actuation of appropriate input keys 68, or the user can rely on preset default values. The specific input keys 68 and the actual layout of those keys, however, will vary between manufacturers and models of the multifunction peripheral.

Subsequently, the user initiates the activity at the multifunction peripheral interface, as represented by block 74. Typically, the initiation of activity is accomplished by pressing a function initiation key 60, e.g., copy key 64. When copy key 64 is actuated, an alert signal is sent from the peripheral 16 across communication link 17 to host 15, as represented by block 76. Upon receiving the alert signal, host 15, via processor 52, outputs a signal to multifunction peripheral 16 to query the multifunction peripheral for preset parameters regarding the copying operation, as represented by block 78.

An item to be copied, such as a page from a document, is then scanned into memory 54 of host 15, as represented by block 80. In other words, the document is scanned by scanner 44, which, in turn, is driven by host 15, and the data is transferred across communication link 17 to memory 54. Once stored in memory 54, the data may be massaged or manipulated according to the preset parameters or any other parameters established to provide a desired product. (see block 82). Following the manipulation of data, the data is transmitted back to the peripheral 16, and specifically to printer 46, for printing. (see block 84). Consequently, the image of the item to be copied is printed at the peripheral 16, as indicated by block 86. At this stage, the copy operation, at least for the initial item to be copied, is completed.

As discussed above, with certain hosts, such as personal computer 18, it may be desirable to return the system to a "sleep" mode between operations. Thus, if no activity occurs at the one or more peripherals 16 for a predesignated period of time, host 15 is returned to the low power sleep mode, as represented by block 88.

Another exemplary function of peripheral 16 is the sending of facsimile transmissions. Assuming the multifunction peripheral has fax capability, such as those illustrated and described above, a facsimile transmission operation can be accomplished by a user at a given multifunction peripheral 16, as illustrated in FIG. 6. In this operation, fax parameters, such as destination telephone number, time and date, source of origin, contrast, etc. are set by the user or established as preset default parameters. (see by block 90) As with the copy operation, the user initiates the desired fax operation at the multifunction peripheral interface 34, as indicated by block 92. This initiation of activity may be accomplished by actuating a function initiation key 60, such as fax key 66.

Upon pressing or otherwise actuating fax key 66, an alert signal is sent from the multifunction peripheral 16 across communication link 17 to host 15, as indicated by block 94. As described above, the alert signal initiates a query from host 15. (see block 96) The multifunction peripheral is queried to established the preset parameters related to the fax function.

Subsequently, an item, such as a sheet having an image, e.g. printed matter, diagram, chart, etc., is scanned by scanner 44. The scanned data is transferred into the memory 54 of host 15, as represented by block 98. In memory 54, the data is manipulated according to the preset parameters or any other parameters regarding the item or the transmission. (see block 100) At this stage, the manipulated data is transferred to modem 56, and sent over communications network 58 to the desired site or destination. (see block 102) As described above, certain hosts may be returned to a low power or "sleep" mode upon completion of the fax operation if no other activity is initiated.

It will be understood that the foregoing description is of preferred embodiments of this invention, and that the invention is not limited to the specific forms shown. For example, a variety of hosts may be utilized in the system; a variety of multifunction peripherals having numerous functional capabilities can be employed; the communication link can be provided in a variety of forms; and the methods of data transfer can be adjusted or changed, as would be understood by those of ordinary skill in the art. These and other modifications may be made in the design and arrangement of the elements without departing from the scope of the invention as expressed in the appended claims.

What is claimed is:

1. A system for utilizing a host in controlling a peripheral task, comprising:

a host having a processor, a memory and a communication interface;

a multifunction peripheral unit having at least a scanner and a printer; and a communication link coupling the host and the peripheral to permit data to flow therebetween, such that data scanned by the scanner is stored in the host memory and the functionality of the peripheral scanner and the printer is controlled by the host processor in response to user input at the peripheral unit;

the peripheral including a user Interface having a plurality of function input keys each operable to enable preset peripheral functions including a scan function and a printer function; actuation of a function input key at the peripheral being operable to cause the peripheral to output an alert signal to the processor, the processor being configured to query the peripheral for parameters related to the enabled peripheral function upon receipt of the alert signal, and wherein actuation of a function input key when the host in a reduced power mode is effective to cause the processor to switch the host to a power-on mode.

2. The system as recited in claim 1, wherein the host comprises a personal computer.

3. The system as recited in claim 2, wherein the personal computer communications interface includes a modem.

4. The system as recited in claim 3, wherein the peripheral unit also includes a facsimile function key actuation of which enables the personal computer to send data, scanned at the scanner, to the modem for transmission over a communications network.

5. The system as recited in claim 2, wherein the communications interface includes a parallel port.

6. A method of distributing job control between a multi-function peripheral and a host to eliminate the need for a peripheral processor and a peripheral memory, comprising:

setting scan parameters at a multi-function peripheral using a peripheral user interface at said peripheral;

communicating a user input signal from the peripheral to a processor of a host unit to wake the host from a sleep power mode and to initiate a scanning function by the peripheral;

scanning a desired image based on the scan parameters and under the control of the host processor;

storing scan data of the desired image in a memory of the host unit; and processing the stored scan data under control of the host processor.

7. The method as recited in claim 6, further comprising using the stored scan data to print the desired image at the peripheral.

8. The method as recited in claim 6, further comprising operating the host processor to transmit the stored scan data of the desired image over a communications network.

9. The method as recited in claim 6, further comprising setting print function parameters using the peripheral user interface.

10. The method as recited in claim 6, further comprising manipulating the desired image after it is stored in the memory.

11. The method as recited in claim 6, wherein communication of scanned data from the peripheral to the host memory is carried out concurrently with printing by the peripheral of data communicated from the host memory.

12. The method as recited in claim 8, further comprising communicating a user input transmission parameter from the peripheral to the host processor.

13. The method as recited in claim 6, further comprising utilizing a personal computer as the host unit.

* * * * *